(12) United States Patent
Dundon (10) Patent No.: US 8,328,212 B1
(45) Date of Patent: Dec. 11, 2012

(54) VEHICLE SUSPENSION AND METHOD

(75) Inventor: Christopher Brian Dundon, Pataskala, OH (US)

(73) Assignee: Honda Motor Co., Ltd., Tokyo (JP)

( * ) Notice: Subject to any disclaimer, the term of this patent is extended or adjusted under 35 U.S.C. 154(b) by 52 days.

(21) Appl. No.: 13/171,056

(22) Filed: Jun. 28, 2011

(51) Int. Cl.
*B60G 3/18* (2006.01)

(52) U.S. Cl. .... 280/124.138; 280/124.135; 280/124.128

(58) Field of Classification Search ........... 280/124.128, 280/124.138, 124.135, 124.136
See application file for complete search history.

(56) References Cited

U.S. PATENT DOCUMENTS

| | | | |
|---|---|---|---|
| 4,550,926 A | | 11/1985 | MacIsaac |
| 4,957,308 A | * | 9/1990 | Takizawa ............... 280/124.138 |
| 5,048,860 A | * | 9/1991 | Kanai et al. ............. 280/86.757 |
| 5,176,398 A | | 1/1993 | Kanai et al. |
| 5,364,121 A | | 11/1994 | Lee |
| 5,388,855 A | * | 2/1995 | Yamamoto et al. ..... 280/124.138 |
| 5,507,510 A | * | 4/1996 | Kami et al. ............ 280/124.136 |
| 5,716,042 A | | 2/1998 | Derviller |
| 5,924,712 A | | 7/1999 | Pierce |
| 6,073,946 A | | 6/2000 | Richardson |
| 6,938,908 B2 | * | 9/2005 | Oda et al. ............... 280/124.109 |
| 6,957,819 B2 | | 10/2005 | Chalin et al. |
| 7,325,820 B2 | * | 2/2008 | Allen et al. .............. 280/124.15 |
| 7,896,372 B2 | * | 3/2011 | Yanagida ............... 280/124.135 |
| 2007/0007741 A1 | * | 1/2007 | Jargowsky et al. .... 280/124.128 |

FOREIGN PATENT DOCUMENTS

| | | | |
|---|---|---|---|
| JP | 54-53420 A | | 4/1979 |
| JP | 62085705 A | * | 4/1987 |
| JP | 3-50008 A | | 3/1991 |
| JP | 9-39532 A | | 2/1997 |

* cited by examiner

*Primary Examiner* — Ruth Ilan
(74) *Attorney, Agent, or Firm* — Kenealy Vaidya LLP; Mark E. Duell (57) ABSTRACT

The disclosed subject matter relates to a suspension system for use on a vehicle that includes a knuckle, a first trailing arm structure, a second trailing arm structure, an upper arm structure, and a lower arm structure. The first trailing arm structure and second trailing arm structure can be configured to extend in a frontward direction from the knuckle to a connection at a forward portion of a vehicle frame. The upper and lower arm structures can be configured to extend substantially transversely with respect to the vehicle longitudinal axis and connect to a rearward portion of the vehicle frame. The second trailing arm structure can cross underneath the lower arm structure as viewed from a direction normal to a plane defined by the central axis and horizontal axis of the knuckle, such that the second trailing arm structure is located closer to the travel surface of the vehicle than the lower arm structure at a location where the second trailing arm structure crosses underneath the lower arm structure.

26 Claims, 8 Drawing Sheets

CONVENTIONAL ART

VEHICLE SUSPENSION AND METHOD

BACKGROUND

1. Field

The presently disclosed subject matter relates to vehicle suspension systems, and in particular to trailing arm configurations for vehicle suspension systems and methods for manufacturing such a suspension system.

2. Description of the Related Art

Vehicle suspension systems can include a complicated set of linkages, pneumatic devices, and springs that aim to provide a smooth ride for a vehicle. For example, a four bar linkage suspension includes a knuckle connected to lower and upper control arms which in turn are connected to the frame of a vehicle. The control arms are rotatably connected to the vehicle frame (e.g., by a "bar" type pivot/connecting device) so that an end can rotate and move substantially vertically with respect to the vehicle frame. A knuckle typically connects each of the lower control arms to a respective upper control arm, and a wheel mount structure can be attached to the knuckle. Thus, the wheel, when mounted, is permitted to move in a vertical direction relative to the vehicle frame. A stabilizer bar can be connected between the left and right side control arms such that when a particular vertical movement occurs in a wheel on one side of the vehicle, a corresponding movement can take place in the corresponding wheel on the other side of the vehicle. This action prevents roll of the vehicle during turning and/or maneuvering over rough/bumpy roadway surfaces.

A spring is typically connected from one of the upper or lower control arms or knuckle to the vehicle frame, and a strut or shock absorber is also connected between the respective control arm or knuckle and vehicle frame. Thus, the vertical movement of the wheel can be controlled and damped to provide a relatively smooth ride for the vehicle.

Although the above-described four bar suspension system is a common type of vehicle suspension system, there are other types of vehicle suspension systems. Another common vehicle suspension system is the two bar suspension system. In one example of a two bar suspension system, a lower control arm is pivotally connected to a vehicle frame. A lower portion of a knuckle can be connected to the lower control arm and an upper portion of the knuckle can be connected to a rotary link member that incorporates a spring and shock absorber system. Thus, the upper control arm is not necessary in this case.

Typical vehicle suspension systems often require a great number of attachment mechanisms, and a great deal of space. The high number of components and their complex shapes also add cost and weight to a vehicle. In addition, the large volume required for these components also creates restrictions in design and also creates problems during repair in terms of added time required for repair due to limited access to components, and added cost due to this added repair time and due to multiple part requirements. The restriction on design due to the large volume taken by the suspension system can also result in diminished passenger space and/or reduced door space for the vehicle, especially with regard to rear suspension systems and rear doors.

Figure 8:
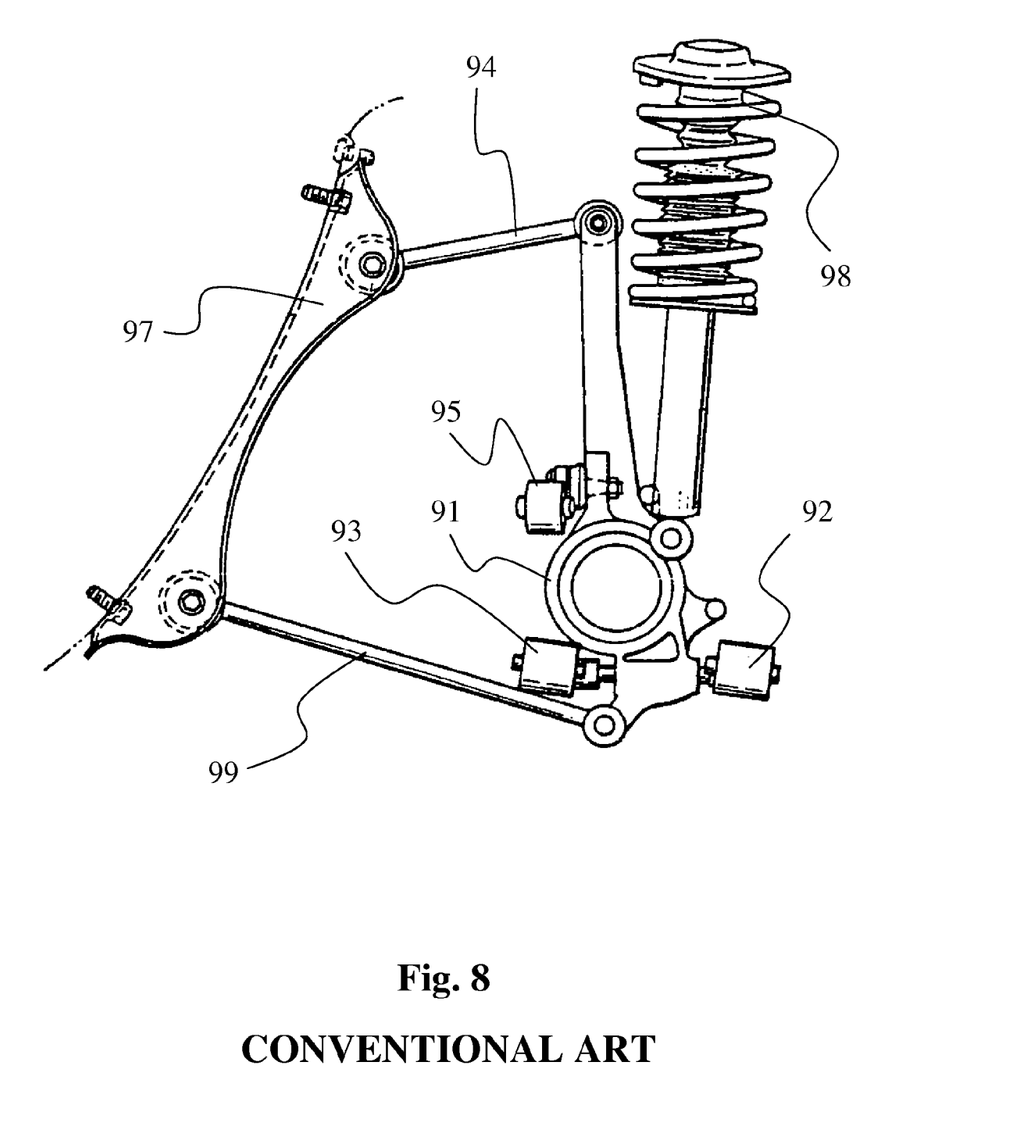
FIG. 8 is a side view of a conventional dual trailing arm suspension system.

In particular, existing rear vehicle suspensions include both single and double trailing arm configurations. As shown in FIG. 8, a conventional double trailing arm suspension structure includes a first upper trailing arm 94 and a first lower trailing arm 99 which extend in the front/rear direction of the vehicle between the knuckle or wheel connection structure 91 and the vehicle body 97. A second upper arm 95 extends in a right/left lateral direction with respect to the vehicle and is located under the upper trailing arm 94. A second lower arm 92 and third lower arm 93 are connected via respective bearings with the wheel connection structure 91 and extend in a right/left lateral direction with respect to the vehicle. The second lower arm 92 and third lower arm 93 are located above a point of attachment between the first lower trailing arm 99 and the wheel connection structure 91. In this particular system, a damper 98 is connected to the wheel connection structure 91.

Figure 6:
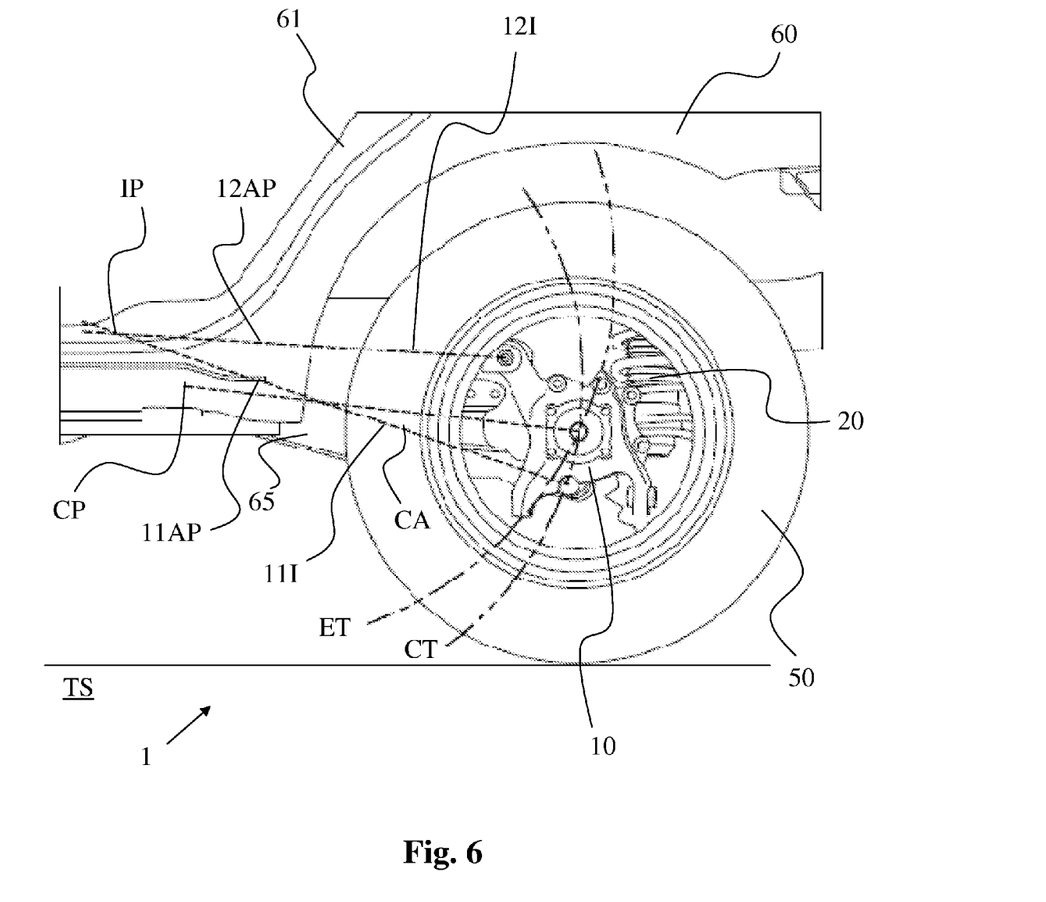
FIG. 6 is a driver side rear portion view of a vehicle that includes the suspension system shown in FIG. 1.

Single trailing arm configurations are also known. For example, FIG. 6 shows, in schematic form, a conventional pivot point CP for connecting a single arm to a vehicle frame in a single arm type suspension system. In this case, the conventional pivot point CP is located vertically lower and horizontally more forward than connection pivot points 11AP and 12AP of the dual arm system depicted in FIG. 1. Several drawbacks are associated with single trailing arm configurations. For example, because connection pivot point CP is located in a far forward position relative to the vehicle's longitudinal axis, the mounting thereof is limited by frame construction requirements. Thus, the amount of anti-squat (mechanical compliance) provided by a single arm suspension system may be reduced. In addition, the far forward position of pivot point CP can interfere with the rear door entry, requiring either a smaller door entryway which may interfere with entry and exit capability for second or third row passengers (depending on type of vehicle) or reduction in efficiency of the suspension system to compensate for a larger doorway. In addition, the single trailing arm configuration is often configured from a single stamped material, which has limited strength capability as compared to a tubular trailing arm.

There is a longstanding need in the art to address the above-described issues, features and characteristics. The disclosed subject matter is directed to a vehicle suspension system that can include a dual trailing arm configuration. As shown in FIG. 6, the dual trailing arm configuration allows the vehicle suspension system to act as if it were a single trailing arm system in which the single trailing arm is connected to the vehicle frame at pivot point IP (which is located in the door opening of the vehicle). However, the actual connection between the upper and lower trailing arms and the vehicle frame of the disclosed dual trailing arm suspension are located at pivot points 11AP and 12AP, which are spaced from the door opening of the vehicle. Thus, the suspension system can provide better rear door access for passengers while possibly providing a better ride characteristic. The dual arms allow the wheel to rotate about a virtual arm structure with pivot point IP. The length of the virtual arm (virtual swing arm length) can be longer than a length of an actual single swing arm.

SUMMARY

According to one aspect of the disclosure a vehicle suspension can include a knuckle configured to be attached to a vehicle wheel. The knuckle can include an aperture having a central axis that corresponds with a rotational axis of the vehicle wheel when the vehicle wheel is attached to the knuckle. The knuckle can be configured to be mounted to a vehicle frame such that a vertical axis of the knuckle and a horizontal axis of the knuckle each intersect the central axis of the knuckle and are perpendicular to the central axis and to each other. The horizontal axis can separate an upper portion of the knuckle from a lower portion of the knuckle, the upper portion of the knuckle being spaced further from a travel surface than the lower portion of the knuckle when the vehicle suspension system is mounted to the vehicle and the vehicle is located on the travel surface. The lower portion of the knuckle can include a lowermost portion of the knuckle that is closer to the travel surface than any other portion of the knuckle. The vertical axis can separate a front portion of the knuckle from a rear portion of the knuckle. A first trailing arm structure can extend in a frontward direction from the knuckle and connect to the knuckle via a first connector that has a rotational axis. The first trailing arm structure can be configured to rotate about the rotational axis of the first connector. A second trailing arm structure can extend in a frontward direction from the knuckle and connect to the knuckle via a second connector that has a rotational axis. The second trailing arm structure can be configured to rotate about the rotational axis of the second connector, and the second connector can be located closer to the lowermost portion of the knuckle than the first connector. A lower arm structure can extend in a substantially transverse direction from the knuckle and connect to the knuckle via a lower connector such that the lower arm structure is configured to rotate about a rotational axis of the lower connector. An upper arm structure can extend in a substantially transverse direction from the knuckle and connect to the knuckle via an upper connector such that the upper arm structure is configured to rotate about a rotational axis of the upper connector. The upper connector can be located a greater distance from the lowermost portion of the knuckle than the lower connector, wherein the second trailing arm structure crosses above the lower arm structure at a crossing location as viewed from a direction normal to a plane defined by the central axis and the horizontal axis of the knuckle, such that the second trailing arm structure is located further from the travel surface than the lower arm structure at the crossing location where the second trailing arm structure crosses above the lower arm structure.

According to another aspect of the disclosed subject matter, a vehicle suspension can include a knuckle configured to be attached to a vehicle wheel and including an aperture having a central axis that corresponds with a rotational axis of the vehicle wheel when the vehicle wheel is attached to the knuckle, the knuckle being configured to be mounted to a vehicle frame such that a vertical axis of the knuckle and a horizontal axis of the knuckle each intersect the central axis of the knuckle and are perpendicular to the central axis and to each other, the horizontal axis separating an upper portion of the knuckle from a lower portion of the knuckle, the upper portion of the knuckle being spaced further from a travel surface than the lower portion of the knuckle when the vehicle suspension system is mounted to the vehicle and the vehicle is located on the travel surface. The lower portion of the knuckle can include a lowermost portion of the knuckle that is closer to the travel surface than any other portion of the knuckle, and the vertical axis can separate a front portion of the knuckle from a rear portion of the knuckle. A first trailing arm structure can extend in a frontward direction from the knuckle and connect to the knuckle via a first connector that has a rotational axis and the first trailing arm structure is configured to rotate about the rotational axis of the first connector. A second trailing arm structure can extend in a frontward direction from the knuckle and connect to the knuckle via a second connector that has a rotational axis. The second trailing arm structure can be configured to rotate about the rotational axis of the second connector, and the second connector can be located closer to the lowermost portion of the knuckle than the first connector. A lower arm structure can extend in a substantially transverse direction from the knuckle and connect to the knuckle via a lower connector such that the lower arm structure is configured to rotate about a rotational axis of the lower connector. An upper arm structure can extend in a substantially transverse direction from the knuckle and be connected to the knuckle via an upper connector such that the upper arm structure is configured to rotate about a rotational axis of the upper connector. The upper connector can be located a greater distance from the lowermost portion of the knuckle than the lower connector, wherein the second connector is located closer to the central axis of the knuckle than the lower connector in both a vertical axis direction and a horizontal axis direction.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A description will now be made below with respect to examples of apparatuses and methods of the presently disclosed subject matter with reference to the accompanying drawings and in accordance with exemplary embodiments of the disclosed subject matter.

Figure 1:
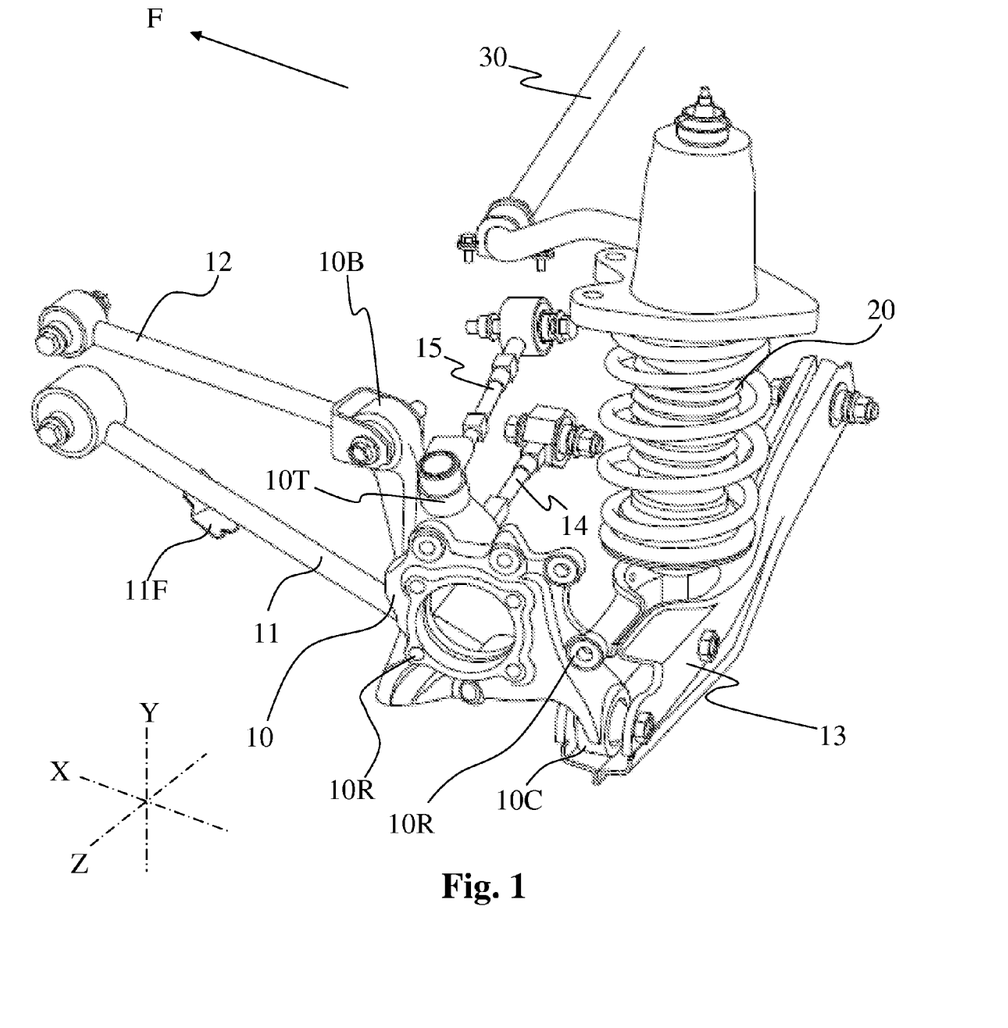
FIG. 1 is a perspective view of an embodiment of a suspension system made in accordance with principles of the disclosed subject matter.

FIG. 1 shows an exemplary embodiment of a vehicle suspension system 1 made in accordance with principles of the disclosed subject matter. The vehicle suspension system 1 can include a knuckle 10 that is configured to connect to a wheel of a vehicle at knuckle aperture 100, and can include several connection structures 10R for connecting the knuckle 10 to various structural and peripheral elements (e.g., for connection to a wheel, brake elements, etc.). The knuckle 10 depicted is for a driver side rear suspension system of a vehicle. For purpose of reference, the longitudinal axis of the vehicle upon which the vehicle suspension system 1 is mounted will be considered to extend parallel with the X axis direction shown in FIG. 1. The central axis of the aperture 100 of knuckle 10 coincides with the rotational axis of the wheel mounted thereto and is considered the Z axis. The Y axis is considered the height direction of the vehicle suspension system 1. The X axis, Y axis, and Z axis are all normal with respect to each other. The front of the vehicle is in a direction shown by arrow F. Thus, the positive side of the X axis will be considered to extend from the knuckle 10 in the longitudinal direction and towards the front of the vehicle (leftward direction in FIG. 1), the positive side of the Y axis will be considered to be the upward direction in FIG. 1, and the positive side of the Z axis will be considered leftward or the out of the paper direction in FIG. 1.

In this embodiment, an upper trailing arm 12 is connected to connector structure 10B which can include a through hole located at the end of an extension arm formed in the knuckle 10. A lower trailing arm 11 can be connected to the knuckle 10 at connector structure 10L which, in this embodiment, includes an opening in a rear side of the knuckle 10 from which a dowel 71 extends (see FIG. 3A).

A lower transverse arm 14 can be connected to the knuckle 10 at connector structure 10A which can include another opening in the rear side of the knuckle 10 from which dowel 72 extends. The connector structure 10A for the lower transverse arm 14 is located on the knuckle 10 at a position that is further from the central axis Z of knuckle 10 in both the X-axis and Y-axis directions than is the connector structure 10L which serves as the connector for the lower trailing arm 11.

Figure 3A:
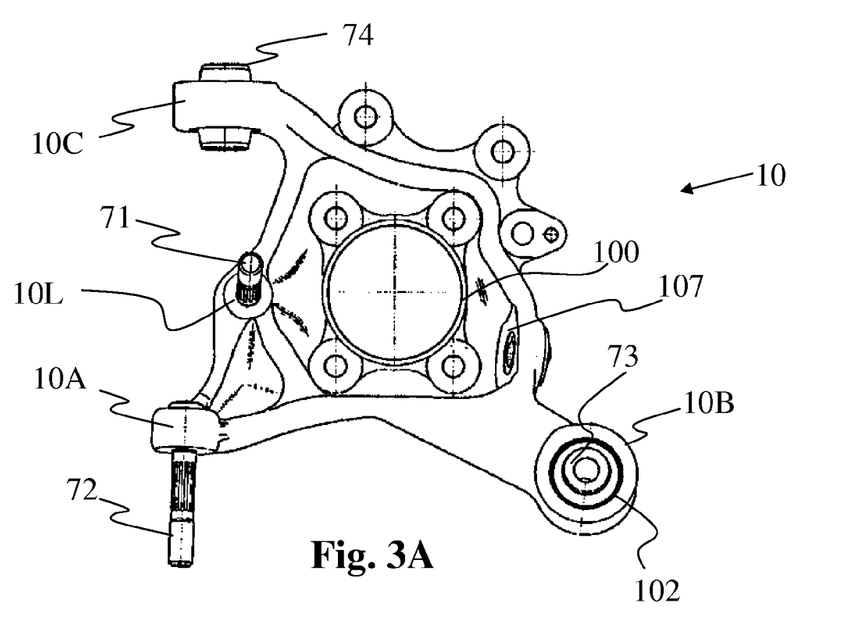
FIGS. 3A-B are a partially assembled rear view, and rear view, respectively, of the knuckle shown in FIG. 1.

An upper transverse arm 15 can be connected to the knuckle 10 at connector 10T. The embodiment depicted in FIGS. 1 and 3A shows the connector 10T which can be configured as a ball joint attached to the knuckle. Other structures, including bushings, etc., can be used to form a rotational connection for the upper transverse arm 15 with respect to the knuckle 10.

A lower rear transverse arm 13 can be connected to the knuckle 10 at connector 10C. Connector 10 C can include an aperture located in an arm extending from a central portion of the knuckle 10. The aperture of connector 10C can cooperate with a bearing and pivot structure that connect to the lower rear transverse arm 13. In this particular embodiment, the lower rear transverse arm 13 is connected to both the vehicle frame 65 and the damper 20. A stabilizer bar 30 can be connected to the damper 20.

The specific relationship of the connections between the above-described structures with respect to the knuckle 10 for the embodiment depicted in FIG. 1 will now be described. It should be noted that in the context of the present disclosure, the phrases "substantially parallel" and "substantially perpendicular" are used to distinguish between the following three categories of structures: 1) a longitudinally extending structure (i.e., a structure that extends generally along a longitudinal direction of the vehicle to which the vehicle suspension system is attached, for example, the upper trailing arm 12 and lower trailing arm 11 of the embodiment of FIG. 1); 2) a transversely extending structure (i.e., a structure that extends generally in a direction perpendicular to the longitudinal direction and height direction of the vehicle, for example, the upper transverse arm 15, lower transverse arm 14, and rear lower transverse arm 13 of the embodiment of FIG. 1); and 3) a vertically extending structure (i.e., a structure that extends perpendicular to both the longitudinal and transverse directions of the vehicle, for example, the post extending from the connection structure 10T of the embodiment of FIG. 1). Accordingly, the phrase "substantially parallel" will mean within 45 degrees of a subject axis (e.g., substantially parallel with the longitudinal axis will include structures that extend within 45 degrees leftward and 45 degrees rightward of the longitudinal axis). Likewise, the phrase "substantially perpendicular" will also mean within 45 degrees of a subject axis (e.g., substantially perpendicular to the longitudinal axis will include structures that extend within 45 degrees leftward and 45 degrees rightward of a line that is perpendicular to the longitudinal axis).

The upper trailing arm 12 can be connected to the knuckle 10 by a rotational connector that includes a bearing located within an aperture in the connector. A pin, bolt or other structure can be used to extend through the bearing and provide the rotational pivot point for the upper trailing arm 12. Thus, the upper trailing arm 12 extends from the connector 10B in a substantially positive longitudinal direction (substantially parallel with the longitudinal axis of the vehicle) from the knuckle 10 and can rotate about an axis that is substantially parallel with the central axis Z of the knuckle. The lower trailing arm 11 can be connected to the knuckle 10 at connector 10L such that the lower trailing arm 11 can rotate about an axis located at connector 10L that is substantially parallel with the central axis Z of the knuckle. Thus, the lower trailing arm 11 and upper trailing arm 12 each extend substantially parallel with the longitudinal axis of the vehicle.

By contrast, the lower transverse arms 13 and 14 are connected to the knuckle 10 at connector 10C and connector 10A, respectively, such that both the lower transverse arms 13 and 14 can rotate about axes located at connectors 10C and 10A, respectively, that are each substantially perpendicular to both the central axis Z and the height axis Y of the knuckle 10. In other words, both of the lower transverse arms 13 and 14 are connected to the knuckle 10 such that they can each respectively rotate with respect to the knuckle 10 about an axis that is substantially parallel with the longitudinal axis X of the vehicle to which the suspension system is mounted (and substantially parallel to each other).

The upper transverse arm 15 can be connected to the knuckle 10 via the connector 10T which is configured to allow the upper transverse arm 15 to rotate about an axis that is substantially perpendicular to both the central axis Z and the longitudinal axis X. Moreover, the upper transverse arm 15 is connected to the knuckle 10 such that it can rotate with respect to the knuckle 10 about an axis that is substantially parallel with the height axis Y.

FIGS. 2A-D show a front, top, left side and right side view of the knuckle 10 of the embodiment shown in FIG. 1. The knuckle 10 can be forged, cast, molded, or otherwise manufactured from steel or alloy thereof, Aluminum and alloys thereof, and possibly from ceramics, plastics or other materials as well. An aperture 100 can be located at a substantial center portion of the knuckle 10. The aperture 100 can have a central axis Z that coincides with a rotational axis of a wheel that is mounted to the knuckle 10. Connector 10B can include an arm that extends from a main body of the knuckle 10 and includes an aperture 102 that has a central axis that is substantially parallel with the central axis of aperture 100. Connector 10B is located at a position that is spaced from a main body portion of the knuckle 10 in such a manner that connector aperture 102 is located substantially centrally with respect to a positive quadrant of the XY grid shown in FIG. 2A (i.e., at an approximate 45 degree angle with respect to both the positive X axis and positive Y axis).

Figure 2A:
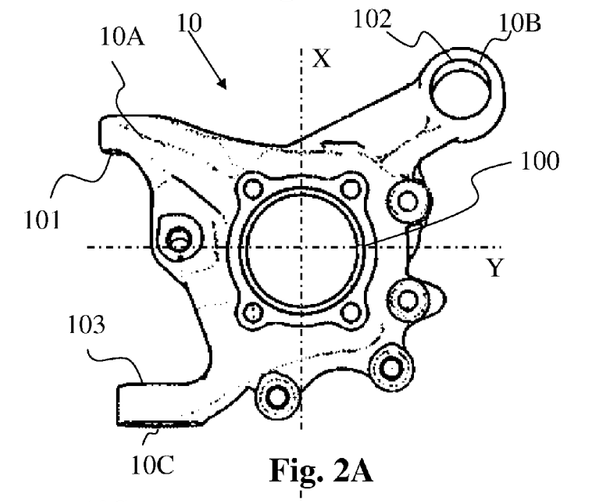
FIGS. 2A-D are a front, top, left side, and right side view, respectively, of the knuckle used in the suspension system shown in FIG. 1.
Figure 2B:
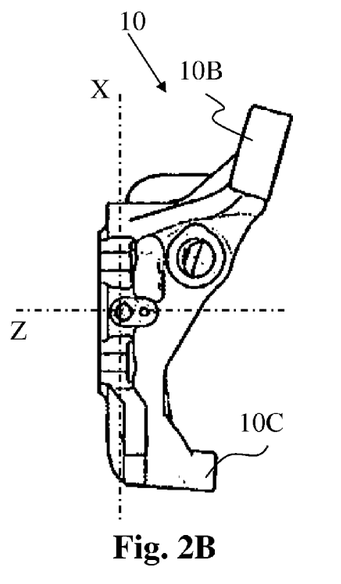
Figure 2C:
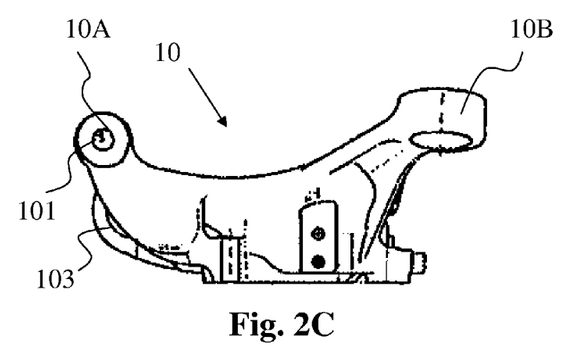
Figure 2D:
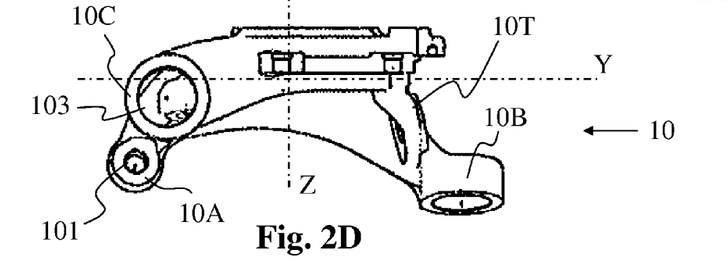

Apertures 101 and 103 can be located in connector 10A and 10C, respectively, and can each have a central axis that is substantially perpendicular to both the central axis of aperture 100 and the Y-axis (substantially parallel to the X-axis or longitudinal axis of the vehicle). In addition, the central axis of aperture 101 can be substantially parallel with the central axis of aperture 103 (i.e., the apertures 101, 103 can be offset). As can be seen in FIG. 2D, the central axis of aperture 101 is located closer to the origin of the XY graph shown in FIG. 2A than is the central axis of aperture 103 (the central axis of aperture 101 is located further in the negative Y-axis direction than the central axis of aperture 103). In addition, the central axis of aperture 103 is located further in the negative Z-axis direction than is the central axis of aperture 101.

Figure 3B:
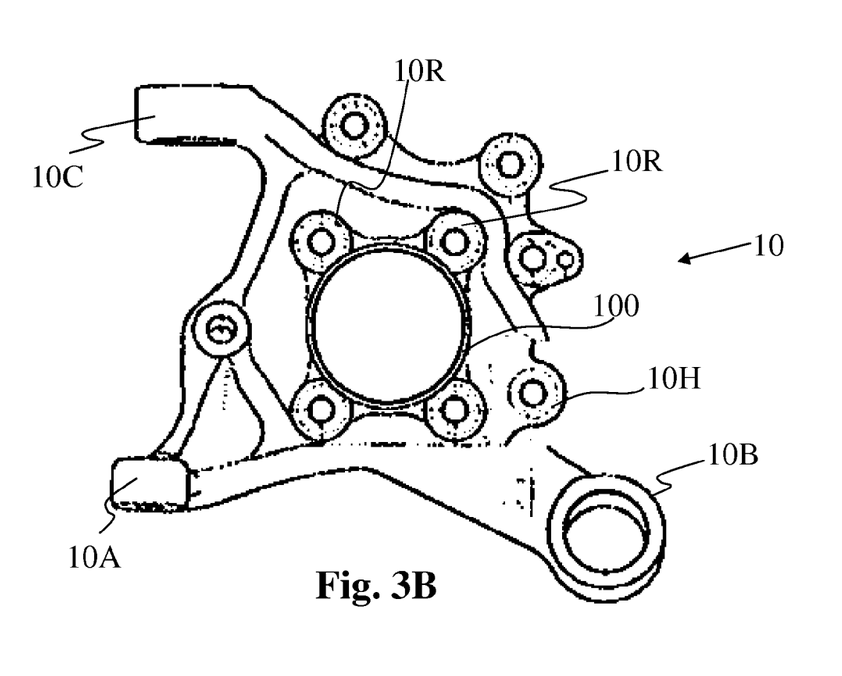

FIGS. 3A and 3B show a rear view of the knuckle 10. Connector 10L is configured for rotational connection to the lower trailing arm 11 and can include an opening in which a dowel pin 71 is secured by press fit or other attachment means. Likewise, connector 10A can be configured for rotational connection to the lower front transverse arm 14 and can include an opening in which a dowel pin 72 is secured by press fit or other attachment means.

Connector 10B can be configured for rotational connection to the upper trailing arm 12 and can include an aperture 102 in which a bearing 73 is located. The bearing 73 can be configured for connection to a pin located on a proximal portion of the upper trailing arm 12. Connector 10C is configured for rotational connection to the lower rear transverse arm 13 and can include an aperture 103 in which a bearing 74 is located. The bearing 74 can be configured for connection to a pin located on a proximal portion of the lower rear transverse arm 13.

Connector 10H can be mounted in an aperture located in the rear face of the knuckle 10. Connector H can be configured as part of a brake for the vehicle, such as a part of a drum in a disk parking brake. Of course, other known brake systems can be used in the presently disclosed subject matter and incorporated at connector H.

Figure 4A:
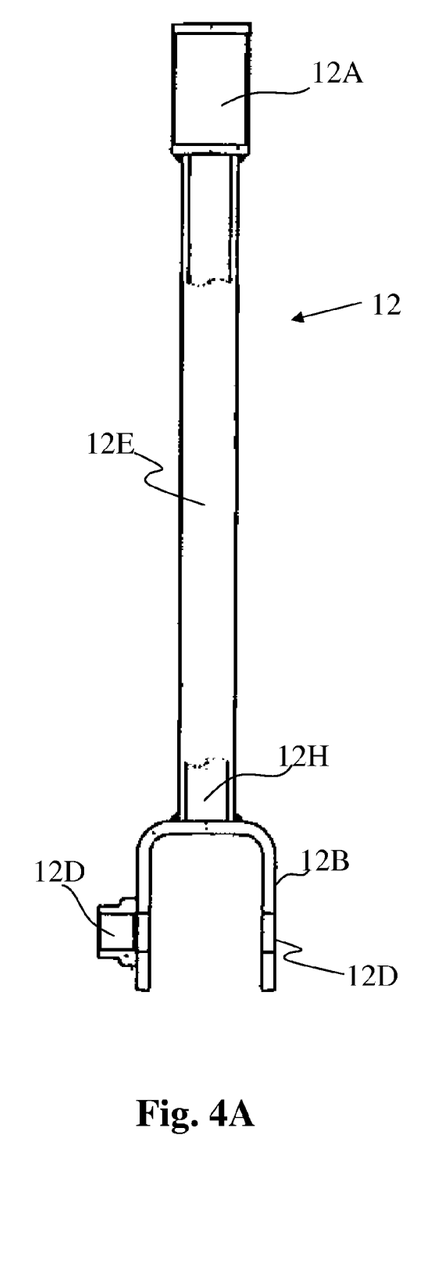
FIGS. 4A-B are a front partial cross section and side view, respectively, of the upper trailing arm used in the suspension system shown in FIG. 1.
Figure 4B:
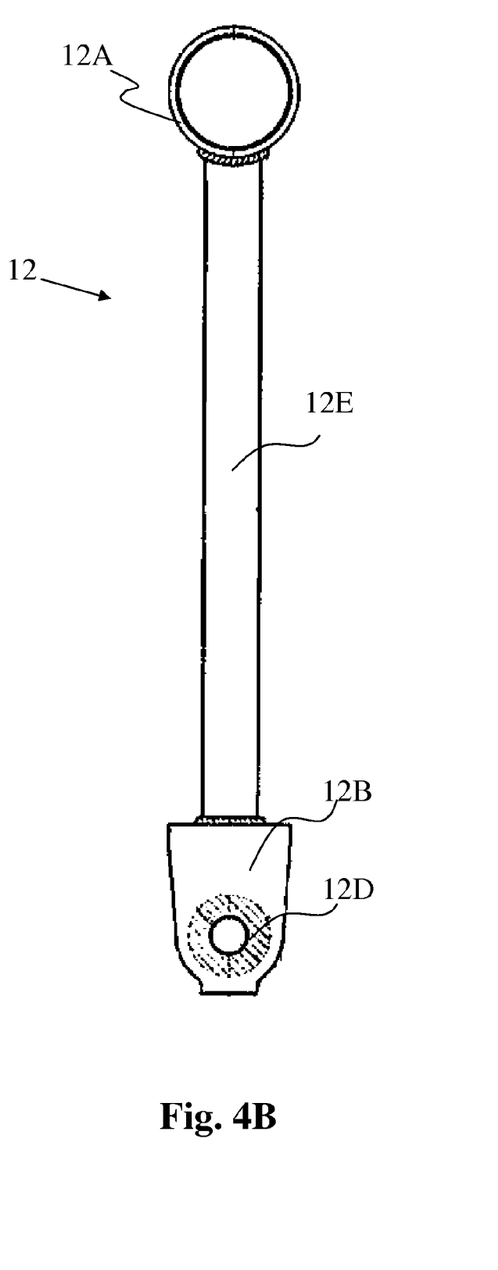

FIGS. 4A and 4B show a front and side view, respectively, of the exemplary upper trailing arm 12. The upper trailing arm 12 can include an elongate bar portion 12E that extends between attachment structure 12A and attachment structure 12B. The bar portion 12E can include a cavity 12H such that the bar is formed in a tubular shape. Attachment structure 12A can be formed as an aperture into which a bearing is located for attachment to the frame 65 of a vehicle via a pin, dowel, bolt, or other known attachment structure. Thus, the upper trailing arm 12 will be attached in a rotatable manner about attachment structure 12A with respect to the vehicle frame 65. Attachment structure 12B can include two arms that extend parallel to each other and in a facing relationship. A through-hole 12D can be located in each of the arms of the attachment structure 12B such that a bolt, pin or other known rotational connection structure can extend through the hole 12D and rotatably connect to a bearing structure located at connector 10B of the knuckle 10. The central axis of the aperture of attachment structure 12A can be parallel or substantially parallel to the central axis of the through hole 12D.

Figure 5:
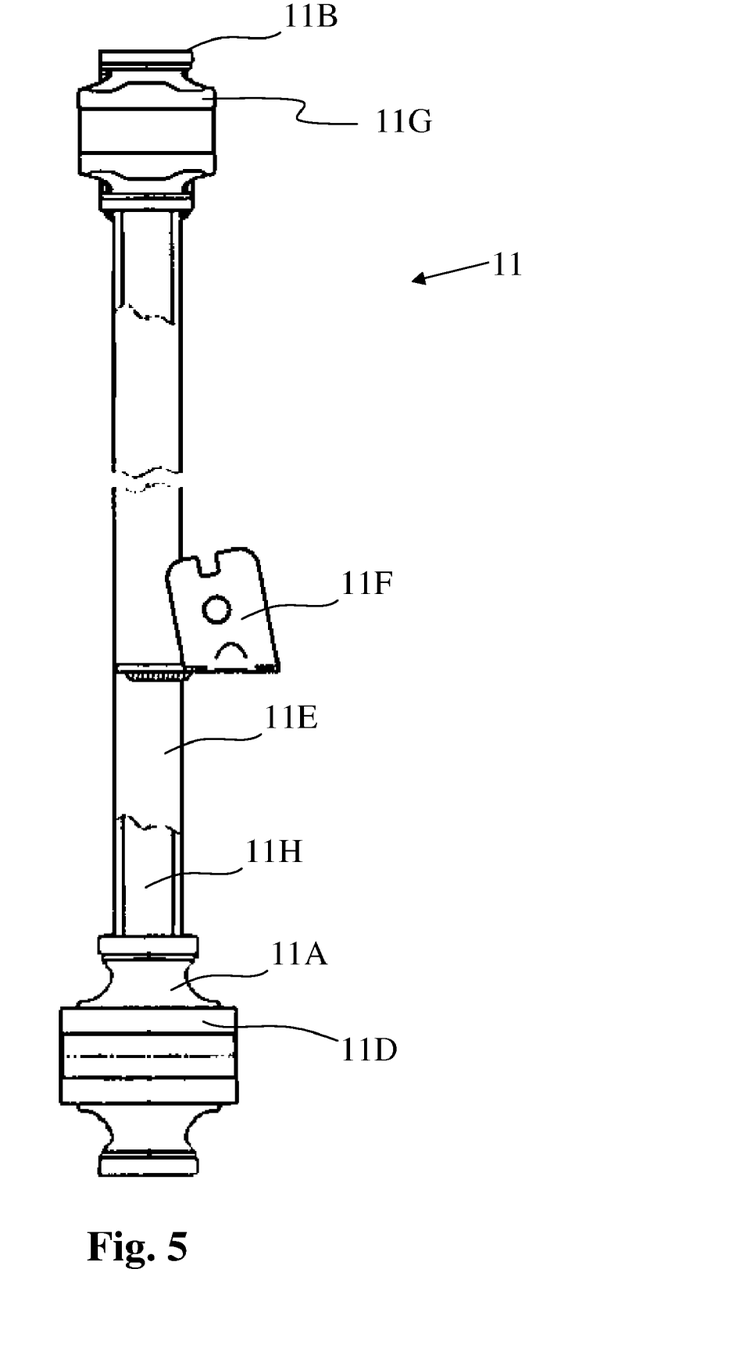
FIG. 5 is a front partial cross section of the lower trailing arm used in the suspension system shown in FIG. 1.

FIG. 5 shows a front view of the lower trailing arm 11 of FIG. 1. The lower trailing arm 11 can include an elongate bar portion 11E that extends between an attachment structure 11A and an attachment structure 11B. The bar portion 11E can include a cavity 11H such that the bar is formed in a tubular shape. Attachment structure 11A can be formed as a structure that defines an aperture into which a bearing 11D is located for attachment to the frame 65 of a vehicle via a pin, dowel, bolt, or other known pivot structure. Thus, the lower trailing arm 11 will be attached in a rotatable manner about attachment structure 11A with respect to the vehicle frame 65, and at a location that is closer to a travel surface for the vehicle than the location of the attachment structure 12D for the upper trailing arm 12. Attachment structure 11B can be located at an opposite end of the bar portion 11E with respect to attachment structure 11A and can include a structure that defines an aperture. A bearing 11G can be located in the aperture of attachment structure 11B for attachment to the knuckle 10 at connector 10L via dowel 71 or other rotational connection structure. Thus, the lower trailing arm 11 will be attached in a rotatable manner about attachment structure 11B with respect to the knuckle 10. The central axis of the aperture of attachment structure 11A can be parallel or substantially parallel to the central axis of the aperture of attachment structure 11B.

FIG. 6 shows a driver side rear portion view of a vehicle that includes the exemplary vehicle suspension system and includes schematic markings to compare the geometry and ride characteristics of the exemplary embodiment of the disclosed subject matter with respect to a conventional single trailing arm suspension.

Dotted line 11I and 12I show the orientation of the upper trailing arm 11 and lower trailing arm 12 of the vehicle suspension system 1 with respect to the vehicle body 60, door opening 61, and tire 50 of the vehicle. The actual pivot points 11AP and 12AP at which the lower trailing arm 11 and upper trailing arm 12 are connected to the vehicle frame 65 are substantially aligned in a vertical straight line direction and at a location that is spaced from the door opening 61. By contrast, the imaginary pivot point IP at which the dotted lines 11I and 12I intersect is located further from the knuckle 10 and within the door opening 61. Thus, the combined upper trailing arm 12 and lower trailing arm 11 provide a ride geometry for the vehicle suspension 1 that emulates a single trailing arm attached to the vehicle frame 65 at the imaginary pivot point IP.

By comparison, a conventional single trailing arm is typically attached to the vehicle frame 65 at conventional pivot point CP. The location of the conventional pivot point CP is dictated by, among other variables, space restrictions due to the door opening 61 for the vehicle. Thus, the conventional pivot point CP is located closer to a travel surface TS for the vehicle than is the imaginary pivot point IP of the vehicle suspension system 1.

Dotted lines ET and CT represent the travel path for the knuckle 10 and wheel structure 50 when using the presently described embodiment of the vehicle suspension system 1 as compared to the conventional single arm CA, respectively. Travel path ET has a greater horizontal or X-axis component than does the travel path AT. Travel path AT is a more vertically oriented travel path which results in less dampening and a greater range and amplitude of road frequency travelling into the conventional vehicle suspension system and possibly the vehicle body. In other words, the travel path ET can provide the vehicle with better ride characteristics as compared to travel path CT.

Figure 7:
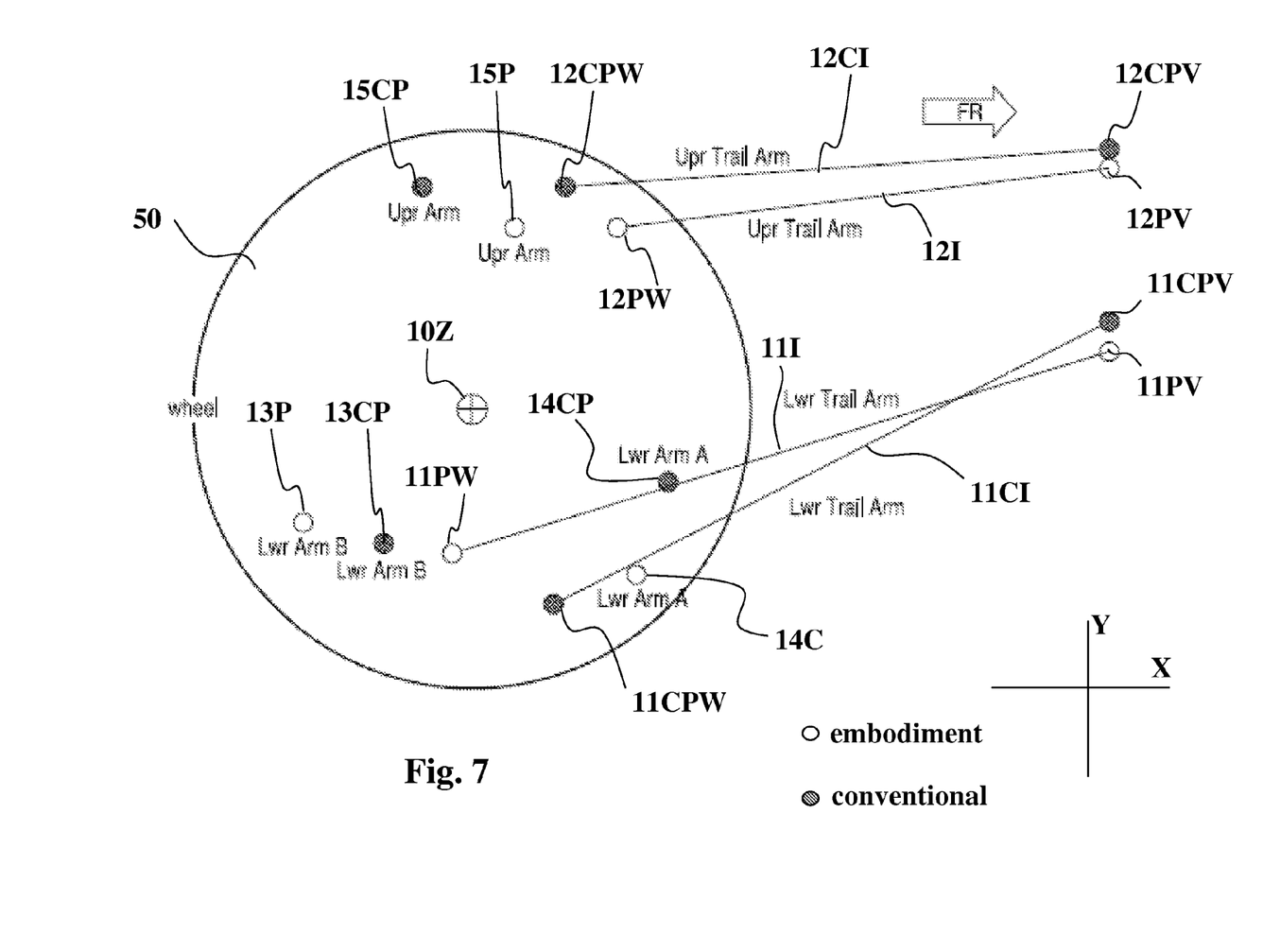
FIG. 7 is a schematic view of the suspension system shown in FIG. 1 as compared to a conventional art suspension system.

FIG. 7 is a schematic drawing depicting the attachment points for the upper and lower trailing arms 12 and 11 with respect to the wheel 50 and frame 65 of the vehicle as compared to connection points for an upper and lower trailing arm of a known or conventional vehicle suspension system. The view is taken from along the positive portion of the Z axis normal to both the X and Y axes, and shows a front of an imaginary/schematic vehicle suspension system located at a passenger side of a vehicle. The location of the upper trailing arm 12 is depicted as dotted line 12I and the location of the lower trailing arm 11 is depicted as dotted line 11I. The location of a conventional upper trailing arm is depicted as dotted line 12CI and the location of a conventional lower trailing arm is depicted as dotted line 11CI.

In addition, the location for attachment of the upper trailing arm 12 to the knuckle 10 is depicted as point 12PW in FIG. 7. Similarly, the location for attachment of the lower trailing arm 11 to the knuckle 10 is depicted as point 11PW. By contrast, the location for attachment of the conventional upper trailing arm to a conventional knuckle is depicted as point 12CPW and the location for attachment of the conventional lower trailing arm to the conventional knuckle is depicted as point 11CPW.

Attachment points 12PV and 11PV show the location of attachment for the upper and lower trailing arms 11 and 12, respectively, to the vehicle frame 65. Similarly, attachment points 12CPV and 11CPV show the location of attachment for the upper and lower conventional trailing arms to a respective vehicle frame. The upper and lower conventional trailing arms are each mounted at connection points that are located at a higher position on the vehicle than their respective counterpart connection points of the disclosed subject matter. Moreover, the upper trailing arm 12 is attached to the vehicle frame 65 at a location 12PV that is closer to the vehicle travel surface TS than is connection location 12CPV for the conventional upper trailing arm. The lower trailing arm 11 is attached to the vehicle frame 65 at a location 11PV that is closer to the vehicle travel surface TS than is the connection location 11CPV for the conventional lower trailing arm.

Connection point 12CPW denotes the connection location of the conventional upper trailing arm to the conventional knuckle. Connection point 12PW denotes the connection location of the upper trailing arm 12 to the knuckle 10 according to the embodiment of FIG. 1. Connection point 12CPW is located closer to the Y axis but further from the X axis than is the connection point 12PW (i.e., connection point 12CPW is located further in the vertical direction from the central axis of the wheel than is connection point 12PW while also located closer in the horizontal direction to the central axis of the wheel as compared to connection point 12PW). The X-Y axis shown in FIG. 7 is centered at (has its origin coinciding with) the central/rotational axis 10Z (Z-axis) of the wheel of the vehicle.

The upper transverse arm 15 is connected to the wheel at connection point 15P while the conventional upper transverse arm is connected to the wheel at connection point 15CP. Conventional arm connection point 15CP is located at a rearward position on the knuckle, or in the negative X-axis direction, as compared to the connection point 15P, which is located at a frontward position on the knuckle 10 and in the positive X-axis direction. Conventional arm connection point 15CP is also located further in the vertical Y-axis direction with respect to the knuckle or wheel than is the connection point 15P, which is located closer to the travel surface of the vehicle.

Connection point 11CPW denotes the connection location of the conventional lower trailing arm to the conventional knuckle. Connection point 11PW denotes the connection location of the lower trailing arm 11 to the knuckle 10 according to the embodiment of FIG. 1. Connection point 11CPW is located further from both the X and Y axes than is the connection point 11PW (i.e., connection point 11CPW is located further in both the vertical and horizontal directions from the central axis 10Z of the wheel than is connection point 11PW). Thus, the connection point 11CPW is located closer to the travel surface TS of the vehicle than is connection point 11PW. Additionally connection point 11PW is located in the negative X-axis direction and connection point 11CPW is located in the positive X-axis direction).

Connection point 13CP denotes the connection location of the conventional lower rear transverse arm to the conventional knuckle. Connection point 13P denotes the connection location of the rear lower transverse arm 13 to the knuckle 10 according to the embodiment of FIG. 1. Connection point 13CP is located further from the X axis (in the negative Y-axis direction) than is the connection point 13P (i.e., connection point 13CP is located further in the negative vertical direction from the central axis of the wheel than is connection point 13P). Thus, the connection point 13CP is located closer to the travel surface TS of the vehicle than is connection point 13P. Connection point 13P is located further from the Y axis (in the negative X-axis direction) than is the connection point 13CP (i.e., connection point 13P is located further in the negative horizontal direction from the central axis of the wheel than is connection point 13CP). Thus, the connection point 13P is located further in the rearward longitudinal direction of the vehicle than is connection point 13CP.

The connection point 13P is located further from the Y axis (in the negative X-axis direction) than is the connection point 11PW (i.e., connection point 13P is located further in the negative horizontal direction from the central axis of the wheel than is connection point 11PW).

Connection point 14CP denotes the connection location of the conventional lower front transverse arm to the conventional knuckle. Connection point 14P denotes the connection location of the front lower transverse arm 14 to the knuckle 10 according to the embodiment of FIG. 1. Connection point 14P is located further from the X-axis (in the negative Y-axis direction) than is the connection point 14CP (i.e., connection point 14P is located further in the negative vertical direction from the central axis of the wheel than is connection point 14CP). Thus, the connection point 14P is located closer to the travel surface TS of the vehicle than is connection point 14CP. Connection point 14CP is located further from the Y-axis (in the positive X-axis direction) than is the connection point 14P (i.e., connection point 14CP is located further in the positive horizontal direction from the central axis of the wheel than is connection point 14P). Thus, the connection point 14P is located further in the rearward longitudinal axis direction of the vehicle than is connection point 14CP.

Connection point 14P is located at a particular X-axis location and particular Y-axis location on the X-Y grid (the X-Y grid being centered at the central/rotational axis 10Z of the wheel). At the particular X-axis coordinate, the lower trailing arm 11 is located at and passes above the transverse arm 14 that extends from the connection point 14P.

By contrast, connection point 14CP is located at a specific X-axis location and specific Y-axis location on the X-Y grid. At the specific X-axis coordinate, the conventional lower trailing arm 11CI is located at and passes below a conventional transverse arm that would extend from the connection point 14CP. This specific orientation and layout requires a higher vertical mounting point for the connection point 14CP associated with the conventional lower transverse arm, and thus reduces camber rigidity as well as toe control.

Thus, the front lower transverse arm 14 of FIG. 1 is located at a position that is closer to the travel surface upon which the vehicle travels at a point at which the lower trailing arm 11 crosses over the transverse arm 14 (as viewed from a Y-axis direction at the point of cross over). Alternatively, a linear imaginary line that is parallel with the Y-axis and intersects both the lower transverse arm 14 and the lower trailing arm 11 will intersect the lower transverse arm 14 at a location closer to the travel surface TS for the vehicle (i.e., further from the X-axis in the negative Y direction) than the location of intersection of the linear imaginary line with lower trailing arm 11.

It should be understood that the connection points described above are each considered a location at which a first structural element rotates with respect to a second structural element connected to the first structural element by the connection point. In addition, it should be understood that the comparison shown in FIG. 7 is only for descriptive purposes of a single embodiment of the disclosed subject matter with respect to a comparative vehicle suspension system. The specific relationships between the various components and structures can and will vary greatly depending on different comparative art suspensions and different embodiments of the presently disclosed subject matter.

In particular, many modifications of the disclosed structure are contemplated that would still fall within the spirit and scope of the presently disclosed subject matter. Although the different arm structures are shown as tubular rods, it is contemplated that the trailing and transverse arms can be made from a pressed material, molded material, or other non-tubular shape. The various connection structures depicted in the attached figures are also exemplary. It should be understood that the connection and attachment components could be reversed (for example, bearing and dowel pins can be reversed and placed or incorporated on respective opposite structures, etc.). In addition, the connection and attachment structures that are depicted could be replaced with altogether different connection and attachment structures which can also have varying different rotational or connective properties depending on the desired application or desired output of the vehicle suspension system.

Although the damper 20 is depicted as a coil over cylinder damper system, the damper can be any of a shock absorber, strut, electric amplifier coil, or other known damper. In addition, the stabilizer bar can be configured in various different manners and attached to different structures without departing from the spirit and scope of the presently disclosed subject matter. In fact, it is contemplated that the stabilizer bar could be removed altogether.

The specific geometry of the knuckle 10 can vary greatly depending on vehicle type, suspension type, type and amount of peripheral devices to be attached (for example, anti-lock brake systems and monitors, other sensors, type of brake systems, etc.).

While the subject matter has been described in detail with reference to exemplary embodiments thereof, it will be apparent to one skilled in the art that various changes can be made, and equivalents employed, without departing from the scope of the invention. All related or conventional art references discussed in the above Description of the Related Art section are hereby incorporated by reference in their entirety.

What is claimed is:

1. A suspension system for use on a vehicle, comprising:
a knuckle configured to be attached to a vehicle wheel and including an aperture having a central axis that corresponds with a rotational axis of the vehicle wheel when the vehicle wheel is attached to the knuckle, the knuckle configured to be mounted to a vehicle frame such that a vertical axis of the knuckle and a horizontal axis of the knuckle each intersect the central axis of the knuckle and are perpendicular to the central axis and to each other, the horizontal axis separating an upper portion of the knuckle from a lower portion of the knuckle, the upper portion of the knuckle being spaced further from a travel surface than the lower portion of the knuckle when the vehicle suspension system is mounted to the vehicle and the vehicle is located on the travel surface, the lower portion of the knuckle including a lowermost portion of the knuckle that is closer to the travel surface than any other portion of the knuckle, and the vertical axis separating a front portion of the knuckle from a rear portion of the knuckle;
a first trailing arm structure extending in a frontward direction from the knuckle and connected to the knuckle via a first connector that has a rotational axis and the first trailing arm structure is configured to rotate about the rotational axis of the first connector;
a second trailing arm structure extending in a frontward direction from the knuckle and connected to the knuckle via a second connector that has a rotational axis and the second trailing arm structure is configured to rotate about the rotational axis of the second connector, the second connector located closer to the lowermost portion of the knuckle than the first connector;
a lower arm structure extending in a substantially transverse direction from the knuckle and connected to the knuckle via a lower connector such that the lower arm structure is configured to rotate about a rotational axis of the lower connector; and
an upper arm structure extending in a substantially transverse direction from the knuckle and connected to the knuckle via an upper connector such that the upper arm structure is configured to rotate about a rotational axis of the upper connector, the upper connector located a greater distance from the lowermost portion of the knuckle than the lower connector, wherein
the second trailing arm structure crosses above the lower arm structure at a crossing location as viewed from a direction normal to a plane defined by the central axis and the horizontal axis of the knuckle, such that the second trailing arm structure is located further from the travel surface than the lower arm structure at the crossing location where the second trailing arm structure crosses above the lower arm structure.

2. The suspension system of claim 1, wherein
at least one of the first trailing arm and the second trailing arm includes a tubular portion.

3. The suspension system of claim 1, further comprising:
a vehicle frame extending in a longitudinal direction of the vehicle from a frame rearward portion to a frame forward portion, the frame rearward portion located closer to a rear of the vehicle than the frame forward portion, wherein
the first trailing arm structure and second trailing arm structure extend and connect to the frame forward portion.

4. The suspension system of claim 3, wherein
the upper arm structure and lower arm structure extend and connect to the frame rearward portion.

5. The suspension system of claim 3, wherein
the first trailing arm structure connects to the frame forward portion at a first location and the second trailing arm structure connects to the frame forward portion at a second location, the second location being closer to the travel surface than the first location when the vehicle is located on the travel surface.

6. The suspension system of claim 5, wherein
the first trailing arm structure connects to the frame forward portion via a first frame connection structure, and the first frame connection structure has a rotational axis substantially parallel with the central axis of the knuckle such that the first trailing arm structure is rotatable about the first frame connection structure rotational axis.

7. The suspension system of claim 3, wherein
the first trailing arm structure connects to the frame forward portion via a first frame connection structure and the first frame connection structure has a rotational axis substantially parallel with the central axis of the knuckle, the first trailing arm structure is rotatable about the first frame connection structure rotational axis.

8. The suspension system of claim 1, wherein
the rotational axis of the first connector is spaced from and extends substantially parallel with the rotational axis of the second connector.

9. The suspension system of claim 1, wherein
the rotational axis of the lower connector of the lower arm structure is substantially parallel with the horizontal axis of the knuckle.

10. The suspension system of claim 1, wherein
the rotational axis of the upper connector of the upper arm structure is substantially parallel with the vertical axis of the knuckle.

11. The suspension system of claim 1, wherein the rotational axis of the first connector is substantially parallel with the central axis of the knuckle.

12. The suspension system of claim 1, wherein the rotational axis of the second connector is substantially parallel with the central axis of the knuckle.

13. The suspension system of claim 1, wherein the crossing location is defined by an imaginary linear line that is normal to the plane defined by the central axis and horizontal axis of the knuckle and which intersects both the second trailing arm and the lower arm structure.

14. A suspension system for use on a vehicle, comprising:
a knuckle configured to be attached to a vehicle wheel and including an aperture having a central axis that corresponds with a rotational axis of the vehicle wheel when the vehicle wheel is attached to the knuckle, the knuckle configured to be mounted to a vehicle frame such that a vertical axis of the knuckle and a horizontal axis of the knuckle each intersect the central axis of the knuckle and are perpendicular to the central axis and to each other, the horizontal axis separating an upper portion of the knuckle from a lower portion of the knuckle, the upper portion of the knuckle being spaced further from a travel surface than the lower portion of the knuckle when the vehicle suspension system is mounted to the vehicle and the vehicle is placed on the travel surface, the lower portion of the knuckle including a lowermost portion of the knuckle that is closer to the travel surface than any other portion of the knuckle, and the vertical axis separating a front portion of the knuckle from a rear portion of the knuckle;
a first trailing arm structure extending in a frontward direction from the knuckle and connected to the knuckle via a first connector that has a rotational axis, the first trailing arm structure being configured to rotate about the rotational axis of the first connector;
a second trailing arm structure extending in a frontward direction from the knuckle and connected to the knuckle via a second connector that has a rotational axis, the second trailing arm structure being configured to rotate about the rotational axis of the second connector, and the second connector located closer to the lowermost portion of the knuckle than the first connector;
a lower arm structure extending in a substantially transverse direction from the knuckle and connected to the knuckle via a lower connector such that the lower arm structure is configured to rotate about a rotational axis of the lower connector; and
an upper arm structure extending in a substantially transverse direction from the knuckle and connected to the knuckle via an upper connector such that the upper arm structure is configured to rotate about a rotational axis of the upper connector, the upper connector located a greater distance from the lowermost portion of the knuckle than the lower connector, wherein
the second connector is located closer to the central axis of the knuckle than the lower connector in both a vertical axis direction and a horizontal axis direction.

15. The suspension system of claim 14, wherein
at least one of the first trailing arm and the second trailing arm includes a tubular portion.

16. The suspension system of claim 14, further comprising:
a vehicle frame extending in a longitudinal direction of the vehicle from a frame rearward portion to a frame forward portion, the frame rearward portion located closer to a rear of the vehicle than the frame forward portion, wherein
the first trailing arm structure and second trailing arm structure extend and connect to the frame forward portion.

17. The suspension system of claim 16, wherein
the upper arm structure and lower arm structure extend and connect to the frame rearward portion.

18. The suspension system of claim 16, wherein
the first trailing arm structure connects to the frame forward portion at a first location and the second trailing arm structure connects to the frame forward portion at a second location, the second location being closer to the travel surface than the first location when the vehicle is located on the travel surface.

19. The suspension system of claim 17, wherein
the first trailing arm structure connects to the frame forward portion via a first frame connection structure, and the first frame connection structure has a rotational axis substantially parallel with the central axis of the knuckle, the first trailing arm structure being rotatable about the first frame connection structure rotational axis.

20. The suspension system of claim 14, wherein
the rotational axis of the first connector is spaced from and extends substantially parallel with the rotational axis of the second connector.

21. The suspension system of claim 14, wherein
the rotational axis of the lower connector of the lower arm structure is substantially parallel with the horizontal axis of the knuckle.

22. The suspension system of claim 14, wherein
the rotational axis of the upper connector of the upper arm structure is substantially parallel with the vertical axis of the knuckle.

23. The suspension system of claim 14, wherein the rotational axis of the first connector and the rotational axis of the second connector are substantially parallel with the central axis of the knuckle.

24. The suspension system of claim 14, wherein the horizontal axis and vertical axis divide the knuckle into an upper front quadrant, a lower front quadrant, an upper rear quadrant, and a lower rear quadrant, and the second connector for the second trailing arm is located in the lower rear quadrant, the lower connector for the lower arm structure is located in the lower front quadrant.

25. The suspension system of claim 24, further comprising a second lower arm extending in a substantially transverse direction from the knuckle and connected to the knuckle via a second lower connector such that the lower arm structure is configured to rotate about a rotational axis of the second lower connector, the second lower connector located in the lower rear quadrant.

26. The suspension system of claim 14, further comprising a second lower arm extending in a substantially transverse direction from the knuckle and connected to the knuckle via a second lower connector such that the lower arm structure is configured to rotate about a rotational axis of the second lower connector.

* * * * *